(12) United States Patent
Uchiyama (10) Patent No.: US 11,009,490 B2
(45) Date of Patent: May 18, 2021

(54) ANALYSIS METHOD AND ANALYSIS DEVICE

(71) Applicant: Shimadzu Corporation, Kyoto (JP)

(72) Inventor: Shinji Uchiyama, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 211 days.

(21) Appl. No.: 16/161,437

(22) Filed: Oct. 16, 2018

(65) Prior Publication Data

US 2019/0128858 A1 May 2, 2019

(30) Foreign Application Priority Data

Oct. 31, 2017 (JP) .............................. JP2017-210723

(51) Int. Cl.
| | |
|---|---|
| *G01N 30/66* | (2006.01) |
| *G01N 27/622* | (2021.01) |
| *G01N 30/62* | (2006.01) |
| *G01N 30/02* | (2006.01) |

(52) U.S. Cl.
CPC ........... *G01N 30/66* (2013.01); *G01N 27/622* (2013.01); *G01N 2030/025* (2013.01); *G01N 2030/626* (2013.01)

(58) Field of Classification Search
CPC ..................................................... G01N 30/66
See application file for complete search history.

(56) References Cited

U.S. PATENT DOCUMENTS

| | | | | |
|---|---|---|---|---|
| 4,464,925 A | * | 8/1984 | Kolloff ................... | G01N 30/66 73/23.4 |
| 5,494,826 A | * | 2/1996 | Stetter .................... | G01N 25/36 374/37 |

FOREIGN PATENT DOCUMENTS

| | | |
|---|---|---|
| JP | H06-258306 A | 9/1994 |
| JP | 10-132797 A | 5/1998 |
| JP | 2000065774 A | 3/2000 |

OTHER PUBLICATIONS

Masami Matsui. "Determination of hydrogen by thermal conductivity detection-GC using helium carrier gas." Analysis Chemistry, 1989, vol. 38, pp. 395-398, partial English-translation provided.
Japanese Office Action dated Feb. 24, 2021, in connection with JP Application No. 2017-210723 (6 pp., including machine-generated English translation).

* cited by examiner

*Primary Examiner* — Paul M. West
*Assistant Examiner* — Mark A Shabman
(74) *Attorney, Agent, or Firm* — Maier & Maier, PLLC (57) ABSTRACT

To increase the difference between the thermal conductivity of the carrier gas and the thermal conductivity of each component of the sample gas. The analysis method is an analysis method that performs analysis using a gas chromatograph including a thermal conductivity detector. The analysis method includes introducing a carrier gas and a sample gas into a separation column, introducing the sample gas separated in the separation column into a gas introduction chamber including an element having an electrical characteristic changed by temperature, detecting a change in the electrical characteristic of the element due to the sample gas being introduced, and switching the carrier gas from a first carrier gas to a second carrier gas that is a different type from the first carrier gas, while a component of the sample gas is passing through the separation column.

19 Claims, 4 Drawing Sheets

ANALYSIS METHOD AND ANALYSIS DEVICE

CROSS-REFERENCE TO RELATED APPLICATION

This application claims priority to Japanese Patent Application No. 2017-210723 filed on Oct. 31, 2017, the entire disclosure of which is incorporated by reference herein.

BACKGROUND

The present disclosure relates to an analysis method and an analysis device.

In gas chromatography, a thermal conductivity detector (TCD) can detect components of various sample gases that have passed through a separation column, on the basis of the difference in thermal conductivity of the gases. However, when the difference between the thermal conductivity of the component of the sample gas to be detected and the thermal conductivity of the carrier gas is small, there is a problem of lowering the strength of the detection signal corresponding to the component of the sample gas, thereby lowering the sensitivity.

In a method disclosed in Japanese Unexamined Patent Publication No. 10-132797, a first column and a second column are used for quantitatively analyzing a small amount of nitrogen gas component in argon gas or oxygen gas, and a part of the argon gas or oxygen gas that is discharged before the small amount of nitrogen gas component is removed in advance, by separating the argon gas or oxygen gas in the first column. Consequently, it is possible to use helium or hydrogen gas having a large difference in thermal conductivity from nitrogen as the carrier gas.

The method disclosed in Japanese Unexamined Patent Publication No. 10-132797 is significantly limited because a plurality of separation columns are to be used. Consequently, it is preferable to increase the difference between the thermal conductivity of the carrier gas and the thermal conductivity of each of a plurality of types of components of the sample gas by using a more general method, to detect the sample gas including the components having different thermal conductivities.

SUMMARY

In one preferred embodiment of the present disclosure, the analysis method is an analysis method that performs analysis using a gas chromatogram including a thermal conductivity detector, and the analysis method includes introducing a carrier gas and a sample gas into a separation column; introducing the sample gas separated in the separation column into a gas introduction chamber including an element having an electrical characteristic changed by temperature; detecting change in the electrical characteristic of the element due to the sample gas being introduced; and switching the carrier gas from a first carrier gas to a second carrier gas that is a different type from the first carrier gas, while a component of the sample gas is passing through the separation column.

In a more preferred embodiment, the type of the second carrier gas is set based on thermal conductivity of the component of the sample gas present in the separation column when the carrier gas is switched.

In a further preferred embodiment, a thermal conductivity constant of the first carrier gas and a thermal conductivity constant of the second carrier gas differ from each other by 5 mW/(m·K) or more at 1 atm and 0 degrees Celsius.

In a still further preferred embodiment, the thermal conductivity constant of the first carrier gas is lower than the thermal conductivity constant of the second carrier gas.

In a still further preferred embodiment, the carrier gas is switched from the first carrier gas to the second carrier gas, after detecting the change in the electrical characteristic of the element due to hydrogen contained in the sample gas.

In a still further preferred embodiment, the carrier gas is switched from the first carrier gas to the second carrier gas, after a predetermined time has passed from a start of the analysis.

In a still further preferred embodiment, the first carrier gas is argon.

In a still further preferred embodiment, the second carrier gas is helium.

In a still further preferred embodiment, the thermal conductivity constant of the first carrier gas is higher than the thermal conductivity constant of the second carrier gas.

In a still further preferred embodiment, a zero point of a detection signal of the thermal conductivity detector is calibrated according to switching of the carrier gas.

In one preferred embodiment of the present disclosure, the analysis device is an analysis device configured to perform analysis using a gas chromatograph including a thermal conductivity detector, and the analysis device includes a gas introduction chamber configured to be connected to a separation column, and configured to include an element having an electrical characteristic changed by temperature; and a switching unit configured to switch a carrier gas introduced into the separation column from a first carrier gas to a second carrier gas that is a different type from the first carrier gas, while a component of a sample gas introduced into the separation column is passing through the separation column.

In a more preferred embodiment, the analysis device further includes a calibrating unit configured to calibrate a zero point of a detection signal of the thermal conductivity detector according to switching of the carrier gas by the switching unit.

In a further preferred embodiment, the switching unit switches the carrier gas from the first carrier gas to the second carrier gas, after a predetermined time has passed from a start of the analysis.

In a still further preferred embodiment, the analysis device further includes a display unit that displays an input screen for inputting the predetermined time.

With the present disclosure, it is possible to increase the difference between the thermal conductivity of the carrier gas and the thermal conductivity of each component of the sample gas. As a result, it is possible to highly accurately detect each component of the sample gas.

DETAILED DESCRIPTION

Hereinafter, an embodiment of the present disclosure will be described with reference to the accompanying drawings.

In gas chromatography using a thermal conductivity detector, an analysis method of the present embodiment switches the type of carrier gas, while the component of a sample gas is passing through a separation column (hereinafter, referred to as switching of carrier gas). In the following embodiment, a first carrier gas is a carrier gas introduced into the separation column before the switching of carrier gas, and a second carrier gas is a carrier gas to be introduced into the separation column after the switching of carrier gas.

Figure 1:
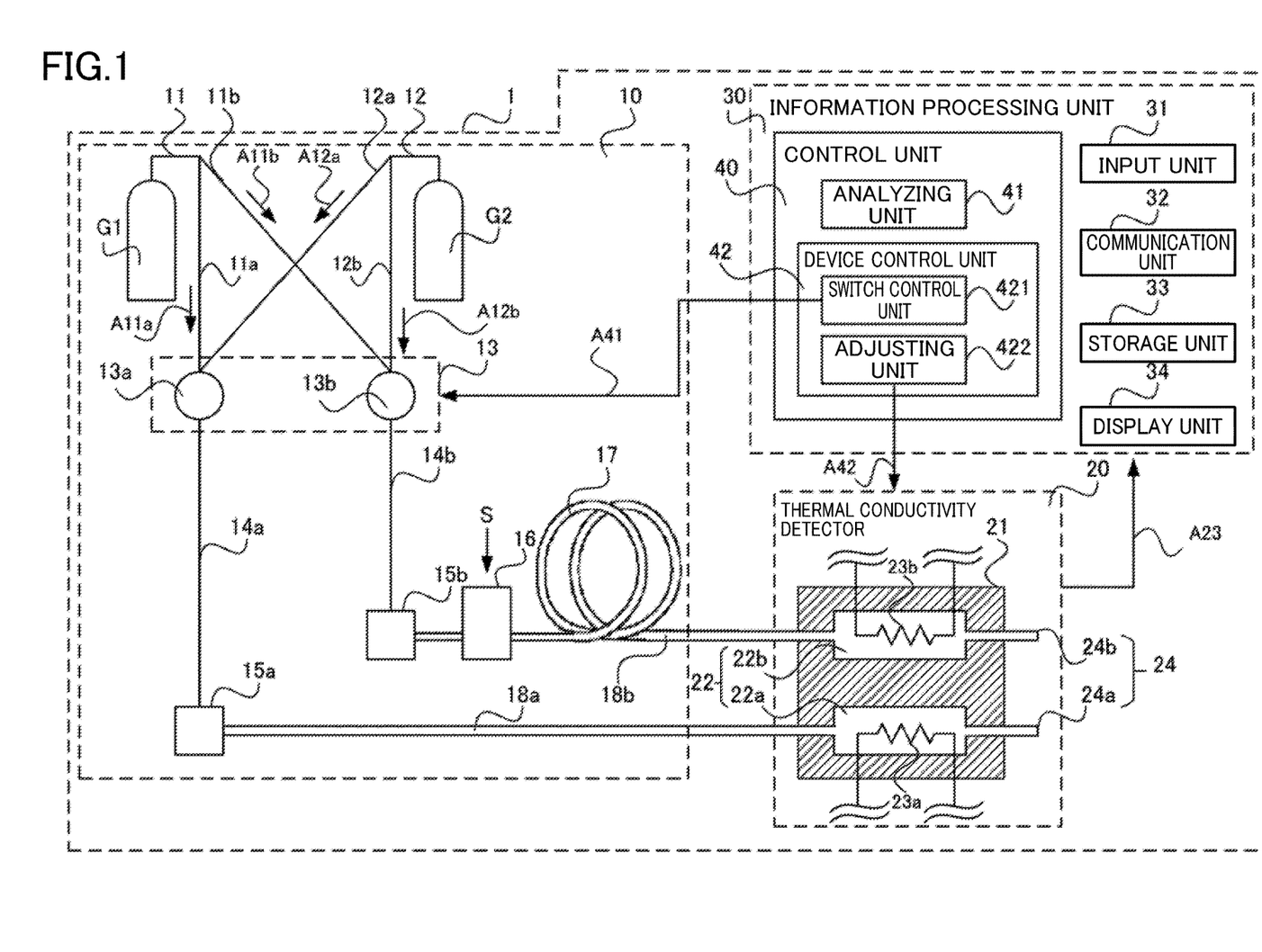
FIG. 1 is a diagram illustrating a schematic configuration of an analysis device according to an analysis method of an embodiment.

FIG. 1 is a diagram illustrating a schematic configuration of an analysis device according to an analysis method of the present embodiment. An analysis device 1 is a gas chromatograph, and includes a separation unit 10, a thermal conductivity detector 20, and an information processing unit 30.

The separation unit 10 includes a gas storage container G1 that stores therein a first carrier gas, a gas storage container G2 that stores therein a second carrier gas that is a different type from the first carrier gas, a first carrier gas flow passage 11, a first carrier gas reference side flow passage 11a, a first carrier gas sample side flow passage 11b, a second carrier gas flow passage 12, a second carrier gas reference side flow passage 12a, and a second carrier gas sample side flow passage 12b. The separation unit 10 also includes a switching unit 13, a reference side flow passage 14a, a sample side flow passage 14b, a reference side flow rate adjusting unit 15a, a sample side flow rate adjusting unit 15b, a sample introduction unit 16 through which a sample S is introduced, a separation column 17, a reference side connection flow passage 18a, and a sample side connection flow passage 18b. The switching unit 13 includes a reference side switching unit 13a and a sample side switching unit 13b.

The thermal conductivity detector 20 includes a structure body 21, a plurality of gas introduction chambers 22, a reference side element 23a, a sample side element 23b, and an exhaust port 24. In the example of FIG. 1, the thermal conductivity detector 20 includes a reference side gas introduction chamber 22a and a sample side gas introduction chamber 22b as the gas introduction chambers 22, and includes a reference side exhaust port 24a and a sample side exhaust port 24b as the exhaust port 24.

The information processing unit 30 includes an input unit 31, a communication unit 32, a storage unit 33, a display unit 34, and a control unit 40. The control unit 40 includes an analyzing unit 41 and a device control unit 42. The device control unit 42 includes a switch control unit 421 and a calibrating unit 422.

The separation unit 10 separates the components contained in the sample S on the basis of physical and/or chemical characteristics. The sample S is gas when the sample S is introduced to the separation column 17. This is referred to as a sample gas.

The gas storage container G1 of the separation unit 10 stores therein the first carrier gas, and is connected to the first carrier gas flow passage 11. In the analysis method of the present embodiment, two types of carrier gases are used, and the first carrier gas is introduced to the reference side flow passage 14a and the sample side flow passage 14b before the switching of carrier gas, and the second carrier gas is introduced to the reference side flow passage 14a and the sample side flow passage 14b after the switching of carrier gas.

It is also possible to use three or more types of carrier gases, and the switching of carrier gas may be performed a number of times. Moreover, the gas that is once used as the carrier gas and that is stopped being introduced to the separation column 17 due to the switching of carrier gas, may be introduced again to the separation column 17 by the switching of carrier gas.

A type of the first carrier gas is selected on the basis of the thermal conductivity of the component of the sample gas that is to be detected before the switching of carrier gas. It is preferable to select the type of first carrier gas so that the difference between a thermal conductivity constant of the component of the sample gas detected before the switching of carrier gas, and a thermal conductivity constant of the first carrier gas is increased. Consequently, it is possible to increase the detection signal obtained when the thermal conductivity detector 20 detects the component of the sample gas in the first carrier gas, thereby increasing the detection sensitivity.

The following values are examples of the thermal conductivity constant that is an index of the degree of the thermal conductivity of each type of gas, when the unit is mW/(m·K) at 1 atmosphere (atm) and 0 degrees Celsius.

Thermal conductivity constants of gases (mW/(m·K)).

| | |
|---|---|
| helium | 144 |
| hydrogen | 167 |
| nitrogen | 24.1 |
| argon | 16.4 |
| oxygen | 22.9 |

With the above, the thermal conductivity constants of helium and hydrogen are higher than those of nitrogen, argon, and oxygen by several times or more, and are relatively high. Consequently, to detect helium or hydrogen, it is preferable to select argon or the like as the carrier gas, and to detect nitrogen, argon, or oxygen, it is preferable to select helium, hydrogen, or the like as the carrier gas.

In principle, the thermal conductivity detector can detect any gas as long as the thermal conductivities differ. Consequently, it is possible to set the carrier gas on the basis of the thermal conductivity of the component of the sample gas to be detected, to detect gas other than the inorganic gas as described above.

In analyzing the sample gas including inorganic gas, hydrogen tends to flow out from the separation column faster than other inorganic gases (short holding time). Thus, preferably, gas with a thermal conductivity constant lower than that of hydrogen by 30 (mW/(m·K)) or more at 1 atm and 0 degrees Celsius is selected as the first carrier gas. More preferably, gas with a thermal conductivity constant lower than that of hydrogen by 50 (mW/(m·K)) or more is selected as the first carrier gas. Further preferably, gas with a thermal conductivity constant lower than that of hydrogen by 100 (mW/(m·K)) or more is selected as the first carrier gas. The sensitivity for detecting hydrogen is increased with an increase in the difference between the thermal conductivity constant of the first carrier gas and the thermal conductivity constant of hydrogen. In addition to this point, still further preferably, argon is selected as the first carrier gas from the viewpoint of low reactivity and the like.

The gas storage container G2 of the separation unit 10 stores therein the second carrier gas, and is connected to the second carrier gas flow passage 12. The type of second carrier gas is selected on the basis of the thermal conductivity of the component of the sample gas that is to be detected after the switching of carrier gas, in other words, the component of the sample gas that has not yet flowed out from the separation column 17 during the switching of carrier gas, and that is assumed to be present in the separation column 17 and is passing through the separation column 17. Preferably, the type of second carrier gas is selected so that the difference between the thermal conductivity constant of the component of the sample gas that is to be detected after the switching of carrier gas, and the thermal conductivity constant of the second carrier gas is increased. Consequently, it is possible to increase the detection sensitivity, because the detection signal that is obtained when the thermal conductivity detector 20 detects the component of the sample gas in the second carrier gas is increased.

In analyzing the sample gas including inorganic gas, other inorganic gas such as nitrogen or oxygen often flows out from the separation column after hydrogen. Thus, preferably, gas with a thermal conductivity constant higher than that of nitrogen or oxygen by 30 (mW/(m·K)) or more at 1 atm and 0 degrees Celsius is selected as the second carrier gas. More preferably, gas with a thermal conductivity constant higher than that of nitrogen or oxygen by 50 (mW/(m·K)) or more is selected as the second carrier gas. Further preferably, gas with a thermal conductivity constant higher than that of nitrogen or oxygen by 100 (mW/(m·K)) or more is selected as the second carrier gas. The sensitivity for detecting nitrogen or oxygen is increased with an increase in the difference between the thermal conductivity constant of the second carrier gas and the thermal conductivity constant of nitrogen or oxygen. In addition to the above, still further preferably, helium is selected as the second carrier gas from the viewpoint of low reactivity and the like.

In view of the above, when the gas with a high thermal conductivity constant such as hydrogen flows out from the separation column 17 faster than the gas with a low thermal conductivity constant such as nitrogen or oxygen, it is preferable to set the thermal conductivity constant of the first carrier gas lower than the thermal conductivity constant of the second carrier gas.

The difference between the thermal conductivity constant of the first carrier gas and the thermal conductivity constant of the second carrier gas is preferably 5 (mW/(m·K)) or more, more preferably 20 (mW/(m·K)) or more, and further preferably 100 (mW/(m·K)) or more. It is possible to detect the components of the sample gas with various thermal conductivities at high sensitivity, when the difference between the thermal conductivity constant of the first carrier gas and the thermal conductivity constant of the second carrier gas is large.

The first carrier gas flow passage 11 of the separation unit 10 is branched to the first carrier gas reference side flow passage 11a and the first carrier gas sample side flow passage 11b. The first carrier gas reference side flow passage 11a and the first carrier gas sample side flow passage 11b are respectively connected to the reference side switching unit 13a and the sample side switching unit 13b. The flowing directions of the first carrier gas through the first carrier gas reference side flow passage 11a and the first carrier gas sample side flow passage 11b are respectively indicated by arrows A11a and A11b.

The second carrier gas flow passage 12 of the separation unit 10 is branched to the second carrier gas reference side flow passage 12a and the second carrier gas sample side flow passage 12b. The second carrier gas reference side flow passage 12a and the second carrier gas sample side flow passage 12b are respectively connected to the reference side switching unit 13a and the sample side switching unit 13b. The flowing directions of the second carrier gas through the second carrier gas reference side flow passage 12a and the second carrier gas sample side flow passage 12b are respectively indicated by arrows A12a and A12b.

The switching unit 13 switches the carrier gas introduced to the separation column 17 from the first carrier gas to the second carrier gas. The analysis device 1 according to the present embodiment includes the switching unit 13a and the switching unit 13b. The switching unit 13 performs the switching of carrier gas, when the switching unit 13a and the switching unit 13b each switch the flow passage of the carrier gas.

The switching unit 13a includes a valve such as a switching valve. The switching unit 13a is configured so as to be able to switch from a state in which the first carrier gas flows between the first carrier gas reference side flow passage 11a and the reference side flow passage 14a, and the second carrier gas does not flow between the second carrier gas reference side flow passage 12a and the reference side flow passage 14a; to a state in which the second carrier gas flows between the second carrier gas reference side flow passage 12a and the reference side flow passage 14a, and the first carrier gas does not flow between the first carrier gas reference side flow passage 11a and the reference side flow passage 14a (hereinafter, referred to as reference side switching).

The switching unit 13b includes a valve such as a switching valve. The switching unit 13b is configured so as to be able to switch from a state in which the first carrier gas flows between the first carrier gas sample side flow passage 11b and the sample side flow passage 14b, and the second carrier gas does not flow between the second carrier gas sample side flow passage 12b and the sample side flow passage 14b; to a state in which the second carrier gas flows between the second carrier gas sample side flow passage 12b and the sample side flow passage 14b, and the first carrier gas does not flow between the first carrier gas sample side flow passage 11b and the sample side flow passage 14b (hereinafter, referred to as sample side switching).

The switching unit 13 switches the carrier gas that flows through the reference side flow passage 14a and the sample side flow passage 14b from the first carrier gas to the second carrier gas, by performing the reference side switching and the sample side switching.

The configuration of the switching unit 13 is not particularly limited, and for example, the switching unit 13 may be configured by using one or three or more switching valves.

The reference side flow passage 14a and the sample side flow passage 14b of the separation unit 10 respectively connect the switching unit 13a and the switching unit 13b with the reference side flow rate adjusting unit 15a and the sample side flow rate adjusting unit 15b. The reference side flow rate adjusting unit 15a and the sample side flow rate adjusting unit 15b of the separation unit 10 each include a flow regulator, and adjust the respective pressures of the reference side connection flow passage 18a and the sample side connection flow passage 18b, on the basis of the pressures in the reference side connection flow passage 18a and the sample side connection flow passage 18b measured by a pressure sensor, which is not illustrated. The carrier gas that has passed through the reference side flow rate adjusting unit 15a passes through the reference side connection flow passage 18a, and is introduced to the reference side gas introduction chamber 22a of the thermal conductivity detector 20. The carrier gas that has passed through the sample side flow rate adjusting unit 15b is introduced to the sample introduction unit 16.

The sample introduction unit 16 of the separation unit 10 includes an injector such as a syringe and an auto-sampler, and a chamber into which a sample is introduced such as a sample vaporizing chamber. The sample introduction unit 16 temporarily accommodates the sample S injected by the injector, and introduces the sample gas to the separation column 17 while vaporizing the sample S when the sample S is liquid.

The separation column 17 of the separation unit 10 includes a column such as a packed column and a hollow capillary column. The components of the sample gas are separated on the basis of a distribution coefficient between a mobile phase including a carrier gas and a stationary phase of the separation column 17 and the like. Each of the separated components of the sample gas flows out from the separation column 17 at a different timing, passes through the sample side connection flow passage 18*b*, and is introduced to the sample side gas introduction chamber 22*b* of the thermal conductivity detector 20.

The structure body 21 of the thermal conductivity detector 20 includes a block of metal such as stainless steel, and includes the reference side gas introduction chamber 22*a* and the sample side gas introduction chamber 22*b*. The reference side gas introduction chamber 22*a* and the sample side gas introduction chamber 22*b* respectively include the reference side element 23*a* and the sample side element 23*b*. The reference side element 23*a* and the sample side element 23*b* are elements having electrical characteristics changed by temperature. In the present embodiment, the reference side element 23*a* and the sample side element 23*b* are elements the electrical resistance of which is changed by temperature. The carrier gas introduced to the reference side gas introduction chamber 22*a* is discharged from the reference side exhaust port 24*a*. The carrier gas and the sample gas introduced to the sample side gas introduction chamber 22*b* are discharged from the sample side exhaust port 24*b*.

Figure 2:
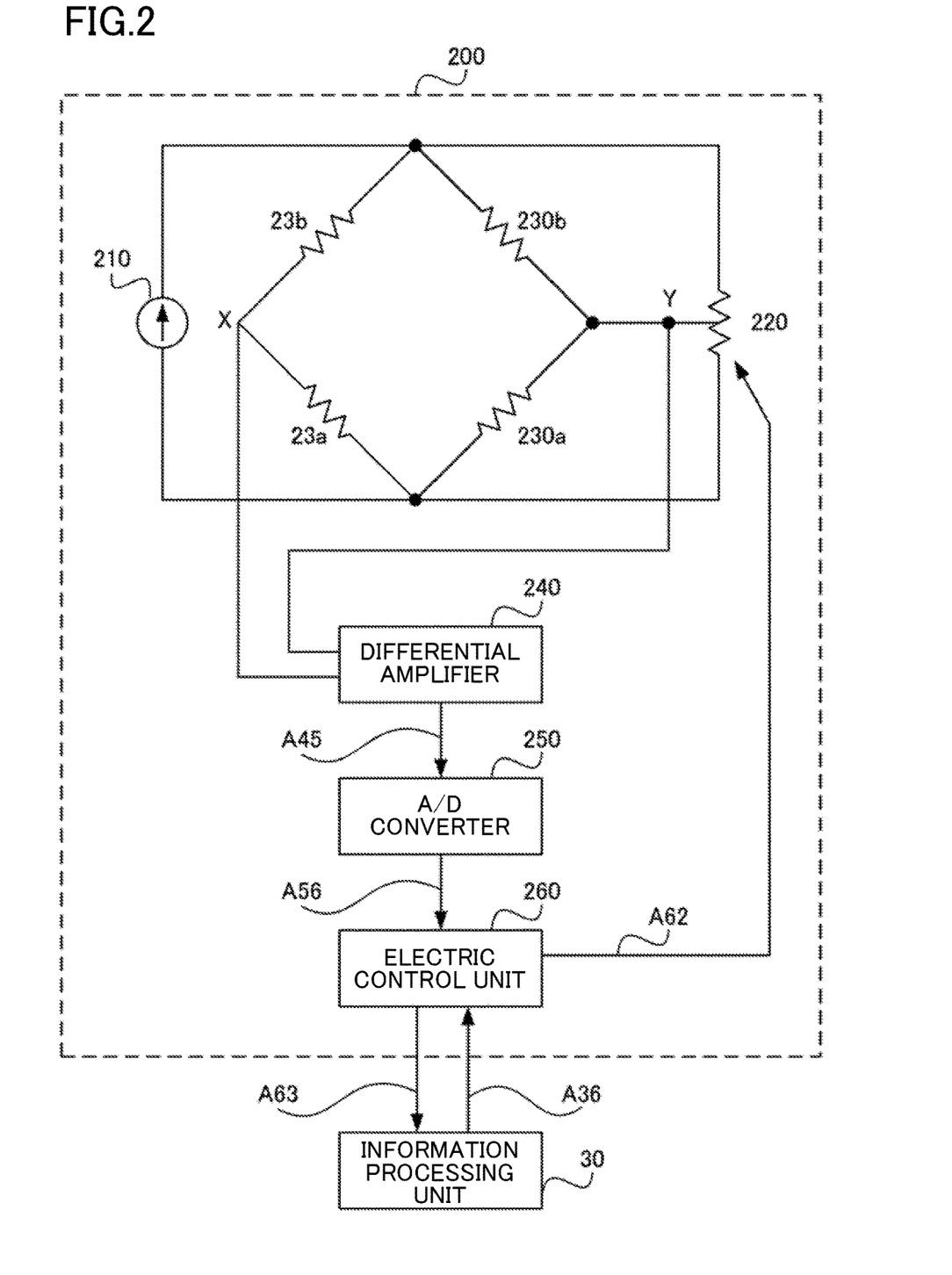
FIG. 2 is a schematic diagram of an electric circuit of the analysis device according to the analysis method of the embodiment.

FIG. 2 is a schematic diagram of an electric circuit 200 for detecting a sample gas in the thermal conductivity detector 20. The electric circuit 200 includes a constant current power supply 210, the reference side element 23*a*, the sample side element 23*b*, fixed resistances 230*a* and 230*b*, a variable resistor 220, a differential amplifier 240, an analog-to-digital (A/D) converter 250, and an electric control unit 260. The reference side element 23*a*, the sample side element 23*b*, and the fixed resistances 230*a* and 230*b* configure a bridge circuit. A constant voltage power supply and the like may also be used instead of the constant current power supply 210.

The thermal conductivity detector 20 detects the component of a sample gas as follows. At first, in FIG. 1, when the component of the sample gas is not flowing out from the separation column 17 even when the sample gas is introduced to the separation column 17, a carrier gas is flowing around the reference side element 23*a* and the sample side element 23*b*, and the component of the sample gas is not substantially present. In this process, the temperatures of the reference side element 23*a* and the sample side element 23*b* are maintained so that the temperature heated by the current that flows through the reference side element 23*a* and the sample side element 23*b*, and the temperature cooled by the carrier gas that flows around the reference side element 23*a* and the sample side element 23*b* become substantially equivalent. In this process, cooling of the reference side element 23*a* and the sample side element 23*b* by the gas that flows around the reference side element 23*a* and the sample side element 23*b* depends on the thermal conductivity of the gas.

When the component of the sample gas flows out from the separation column 17 and the component of the sample gas flows around the sample side element 23*b*, the composition of the gas that flows around the sample side element 23*b* changes, and the component of the sample gas having different thermal conductivity from that of the carrier gas will be included. Consequently, a degree of the sample side element 23*b* cooled by the gas flowing around the sample side element 23*b* changes, and the temperature of the sample side element 23*b* changes depending on the component of the sample gas that flows around the sample side element 23*b*.

Because the electrical resistance of the sample side element 23*b* differs depending on the temperature, it is possible to detect the temperature change of the sample side element 23*b*, by measuring the electrical response of the voltage of the electric circuit 200 (FIG. 2) and the like. In the electric circuit 200 illustrated in FIG. 2, the change in the resistance of the sample side element 23*b*, in other words, the temperature change of the sample side element 23*b* is detected by measuring the voltage between X and Y. In this example, a point X is placed between the reference side element 23*a* and the sample side element 23*b* in the bridge circuit, and a point Y is placed between the fixed resistance 230*a* and the fixed resistance 230*b* in the bridge circuit. The voltage between X and Y is amplified by the differential amplifier 240, and output to the A/D converter 250 (arrow A45). The amplified voltage between X and Y is converted to a digital detection signal by the A/D converter 250, output to the electric control unit 260 (arrow A56), and stored in the storage unit 33 (FIG. 1) after being output to the information processing unit 30 by the electric control unit 260 (arrow A63).

The electric control unit 260 includes a processor such as a microprocessor disposed in the thermal conductivity detector 20, and controls the operations of the units in the thermal conductivity detector 20 such as changing the resistance of the variable resistor 220 on the basis of the control signal from the information processing unit 30. The voltage between X and Y is changed by adjusting the resistance of the variable resistor 220. Consequently, it is possible to calibrate the zero point of the measured value of the voltage. In FIG. 2, the control of the electric control unit 260 by the information processing unit 30 is schematically indicated by an arrow A36, and the control of the variable resistor 220 by the electric control unit 260 is schematically indicated by an arrow A62.

The electric control unit 260 may also be disposed in the information processing unit 30. Moreover, the circuitry configuration of the electric circuit 200 is not particularly limited, as long as the electric circuit 200 can detect changes in the resistance of the sample side element 23*b*. When the electrical characteristics of the sample side element 23*b* other than the resistance changes, the electric circuit 200 may be configured so as to be able to detect such electrical characteristics.

The information processing unit 30 (FIG. 1) includes an information processing device such as an electronic computer, and interfaces with the user. The information processing unit 30 also performs processing such as communicating, storing, and calculating of various types of data.

The information processing unit 30 may also be configured as a single device integrally formed with the separation unit 10 and the thermal conductivity detector 20. A part of data used for the analysis method of the present embodiment may be stored in a remote server and the like, and a part of the calculation processing performed using the analysis method described above may be performed by the remote server and the like.

The input unit 31 is configured including an input device such as a mouse, a keyboard, various buttons, and/or a touch panel. The input unit 31 receives information required for controlling the operation of the separation unit 10 and the thermal conductivity detector 20, information required for the processing carried out by the control unit 40, and the like, from the user.

The communication unit 32 is configured including a communicable communication device wirelessly or wired connected to the Internet and the like. The communication unit 32 transmits data obtained by analysis such as the chromatogram created by the analyzing unit 41, and suitably transmits and receives required data.

The storage unit 33 is configured of a nonvolatile storage medium, and stores therein measured data on the basis of a detection signal from the thermal conductivity detector 20, a program used by the control unit 40 to execute the processing, data obtained by analysis such as the chromatogram created by the analyzing unit 41, and the like.

The display unit 34 is configured including a display monitor such as a liquid crystal monitor, a printer, and the like, and displays and prints measured data on the basis of the detection signal from the thermal conductivity detector 20, data obtained by analysis such as the chromatogram created by the analyzing unit 41, and the like, on the display monitor or on a paper medium.

The control unit 40 is formed of a processor such as a microprocessor including a central processing unit (CPU), and processes the detection signal output from the thermal conductivity detector 20 as measured data, or controls the operation of the analysis device 1 including the separation unit 10, the thermal conductivity detector 20, and the like.

The analyzing unit 41 of the control unit 40 processes and analyzes the detection signal from the thermal conductivity detector 20 as measured data. The analyzing unit 41 constructs data in which the strength of the detection signal is associated with the holding time as data corresponding to the chromatogram, and stores the data in the storage unit 33. Moreover, the analyzing unit 41 identifies the component of the sample gas corresponding to each peak from the holding time corresponding to each peak, on the basis of the past data and the like from the obtained chromatogram data. The analyzing unit 41 calculates the peak strength of each peak and an area corresponding to the peak, and determines the quantity of each component of the sample gas. The analyzing unit 41 generates a display image for displaying the constructed chromatogram data and the information obtained by analysis, and displays the display image on the display unit 34.

The device control unit 42 controls the operation of the units in the separation unit 10 and the thermal conductivity detector 20.

The switch control unit 421 of the device control unit 42 controls the operation of the switching unit 13. The switch control unit 421 switches the carrier gas from the first carrier gas to the second carrier gas, after a predetermined time has passed from the start of the analysis of the sample S. In this example, the "start of the analysis" indicates when any operation to be used as the starting reference for gas chromatography of the sample S is carried out, such as when introduction of the sample S to the sample introduction unit 16 has started, when detection of a sample gas has started, or the like.

The user obtains time from the start of the analysis of the sample S to when the component of the sample gas for detecting the first carrier gas as the carrier gas is detected, and the holding time of the component, on the basis of the past data. The user then sets the predetermined time on the basis of the time. The display unit 34 displays an input screen of the predetermined time so that the user can operate easily. The user can set the predetermined time by entering a numerical value in a text box displayed on the input screen, or by selecting a numerical value by suitably operating an icon such as a scroll bar.

The data corresponding to the predetermined time is stored in the storage unit 33 according to the measurement condition, and the switch control unit 421 may set the predetermined time on the basis of this data.

The calibrating unit 422 of the device control unit 42 calibrates the zero point of the voltage between X and Y (FIG. 2) measured in the thermal conductivity detector 20. When the switch control unit 421 starts the switching of carrier gas, the calibrating unit 422 calculates an average value obtained by arithmetic means or the like of the measured value of the voltage of the background between X and Y after a certain time, and controls the resistance of the variable resistor 220 so that the voltage between X and Y becomes zero on the basis of the average value. In this process, the certain time is suitably set on the basis of time when the thermal conductivity detector 20 can stably perform detection after the switching of carrier gas.

The method of calibrating the zero point is not particularly limited, and for example, the zero point may be calibrated on the basis of the average value of the voltage measured as described above, after roughly calibrating the zero point on the basis of past data and the like.

Figure 3:
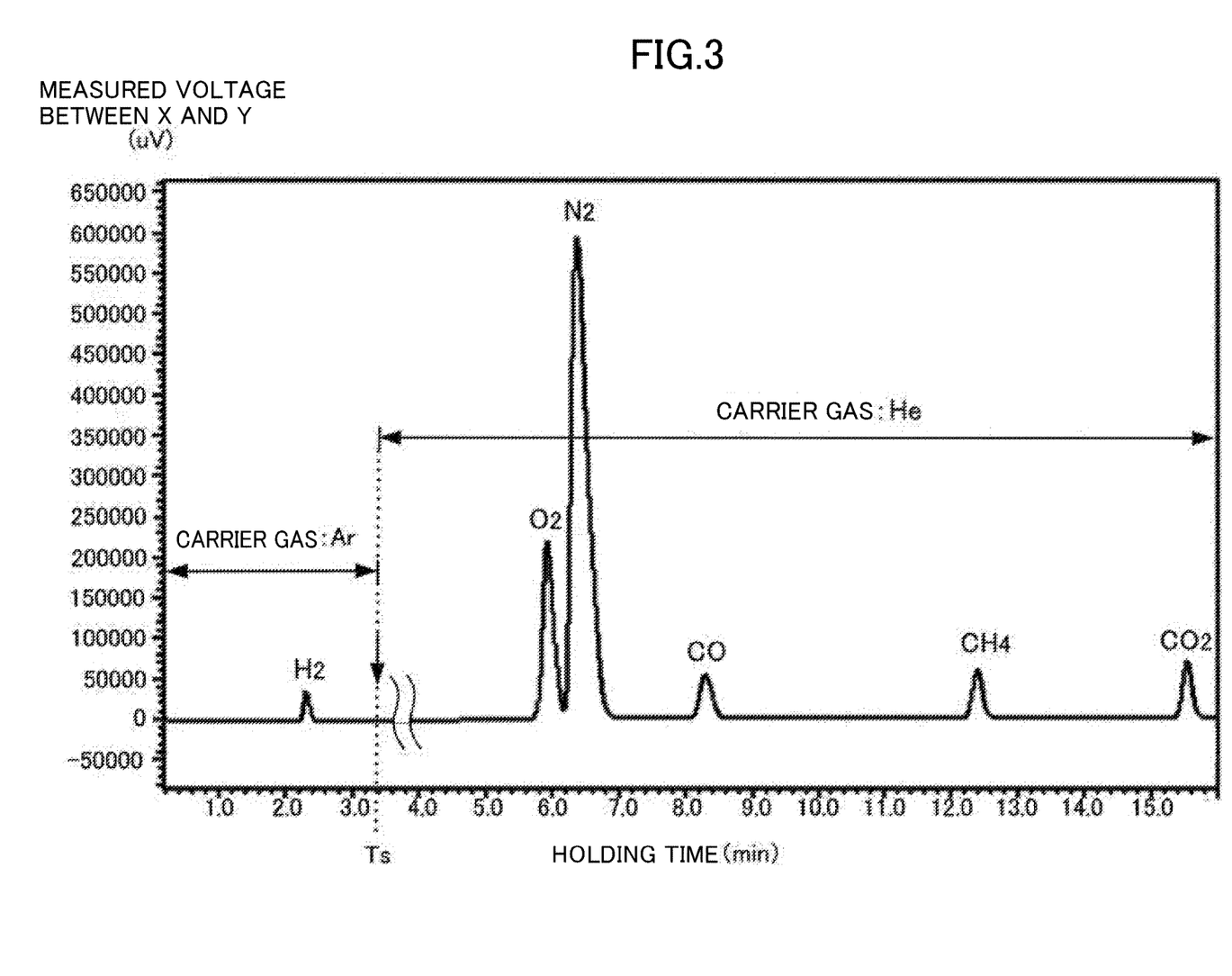
FIG. 3 is a schematic diagram of chromatogram for explaining the analysis method of the embodiment.

FIG. 3 is a schematic diagram illustrating an example of a chromatogram for explaining the switching of carrier gas. Because hydrogen with relatively high thermal conductivity is detected up to a predetermined time (holding time Ts) from the start of the analysis of the sample S, argon that has low thermal conductivity than that of hydrogen and that has a relatively large difference in thermal conductivity from hydrogen is used as the carrier gas (first carrier gas). When the thermal conductivity detector 20 has detected hydrogen, the switch control unit 421 switches the carrier gas from the first carrier gas to the second carrier gas, and calibrates the zero point. When the zero point is calibrated, to detect oxygen, nitride, and the like having relatively low thermal conductivity, helium that has higher thermal conductivity than those of oxygen and nitride, and that has a relatively large difference in thermal conductivity from oxygen and nitride is used as the carrier gas (second carrier gas). In this manner, by switching the carrier gas according to the thermal conductivity of the component of the sample gas to be detected, it is possible to increase the detection sensitivity of the component of each sample gas in a single analysis.

In FIG. 3, positive and negative voltages are reversed in the chromatogram corresponding to the portion where the zero point has been calibrated, from the portion where the zero point is not yet calibrated (portion where the carrier gas is helium). The analyzing unit 41 may display the measured voltage on the chromatogram by suitably changing the positive and negative voltages between the measured X and Y, on the basis of comparison between the thermal conductivity of the carrier gas and the thermal conductivity of the component of the sample gas to be detected. Consequently, the comparison between the peaks becomes easy, thereby making the display easy to view.

Figure 4:
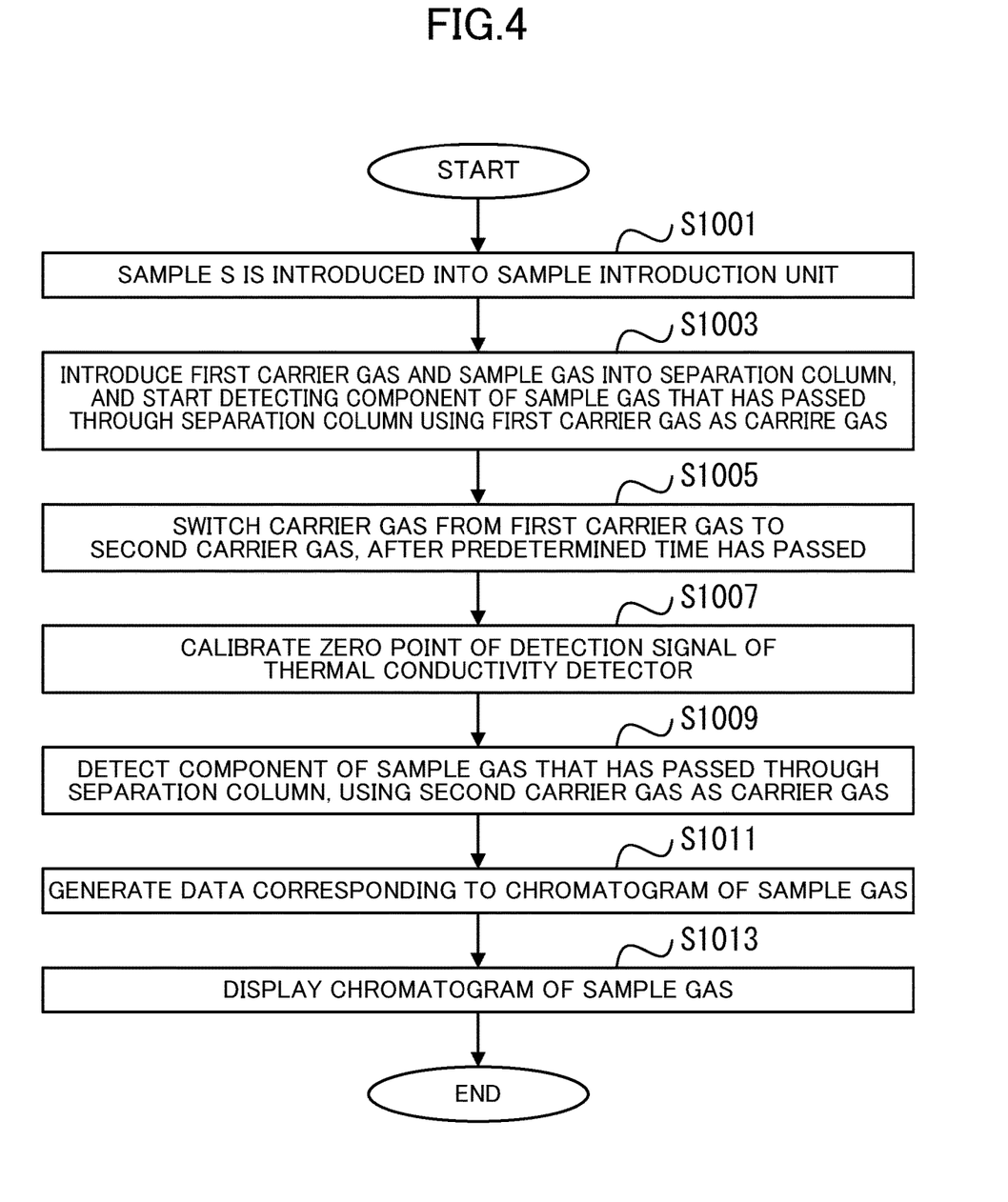
FIG. 4 is a flowchart illustrating a flow of the analysis method of the embodiment.

FIG. 4 is a flowchart illustrating a flow of the analysis method of the present embodiment. At step S1001, the user or the like introduces the sample S into the sample introduction unit 16. After completing step S1001, step S1003 is carried out. At step S1003, the device control unit 42 introduces the carrier gas and the sample gas into the separation column 17, and starts detecting the component of the sample gas that has passed through the separation column 17 using the first carrier gas as the carrier gas. After completing step S1003, step S1005 is carried out.

At step S1005, the switch control unit 421 switches the carrier gas from the first carrier gas to the second carrier gas, after a predetermined time has passed. After completing step S1005, step S1007 is carried out. At step S1007, the calibrating unit 422 calibrates the zero point of the detection signal that is the voltage between X and Y of the thermal conductivity detector 20. After completing step S1007, step S1009 is carried out.

At step S1009, the device control unit 42 detects the component of the sample gas that has passed through the separation column 17 using the second carrier gas as the carrier gas. After completing step S1009, step S1011 is carried out. At step S1011, the analyzing unit 41 generates data corresponding to the chromatogram of the sample gas. After completing step S1011, the process proceeds to step S1013.

At step S1013, the display unit 34 displays the chromatogram of the sample gas generated at step S1011. After completing step S1013, the process is terminated.

With the embodiment described above, the following operational advantages can be obtained.

(1) With the analysis method or the analysis device of the present embodiment, the switch control unit 421 switches the carrier gas from the first carrier gas to the second carrier gas that is a different type from the first carrier gas, while the component of the sample gas is passing through the separation column 17. Consequently, it is possible to increase the difference between the thermal conductivity of the carrier gas and the thermal conductivity of each component of the sample gas. As a result, it is possible to highly accurately detect each component of the sample gas.

(2) With the analysis method or the analysis device of the present embodiment, the type of second carrier gas is set on the basis of the thermal conductivity of the component of the sample gas present in the separation column 17 when the carrier gas is switched. Consequently, the type of second carrier gas is set on the basis of the thermal conductivity of the sample gas detected after the switching of carrier gas, and it is possible to increase the difference between the thermal conductivity of the carrier gas and the thermal conductivity of each component of the sample gas. As a result, it is possible to highly accurately detect each component of the sample gas.

(3) With the analysis method or the analysis device of the present embodiment, the thermal conductivity constant of the first carrier gas is lower than the thermal conductivity constant of the second carrier gas. Consequently, with the sample S including the component having high thermal conductivity and short holding time, it is possible to suitably increase the difference between the thermal conductivity of the carrier gas and the thermal conductivity of each component of the sample gas. As a result, it is possible to highly accurately detect each component of the sample gas.

(4) With the analysis method or the analysis device of the present embodiment, the carrier gas is switched from the first carrier gas to the second carrier gas, after detecting changes in the electrical resistance of the sample side element 23b due to hydrogen contained in the sample gas. Consequently, with the sample S including hydrogen that tends to have high thermal conductivity and short holding time, the difference between the thermal conductivity of the carrier gas and the thermal conductivity of each component of the sample gas is suitably increased. As a result, it is possible to highly accurately detect each component of the sample gas.

(5) With the analysis method or the analysis device of the present embodiment, the switching unit 13 switches the carrier gas from the first carrier gas to the second carrier gas, after a predetermined time has passed from the start of the analysis. As a result, it is possible to easily automate the analysis of the sample S.

(6) With the analysis method or the analysis device of the present embodiment, the calibrating unit 422 calibrates the zero point of the detection signal of the thermal conductivity detector 20 according to the switching of carrier gas carried out by the switching unit 13. Consequently, it is possible to prevent saturation of the detection signals. Moreover, because it is possible to set a larger gain, it is possible to increase the accuracy of the analysis of the sample S.

The following modifications are also within the scope of the present disclosure, and may be combined with the embodiment described above. In the following modifications, the same reference numerals denote the components having the same configurations and functions as those in the embodiment described above, and the explanation thereof will be omitted as appropriate.

First Modification

In the embodiment described above, the thermal conductivity constant of the second carrier gas is higher than the thermal conductivity constant of the first carrier gas. However, the thermal conductivity constant of the second carrier gas may be lower than the thermal conductivity constant of the first carrier gas. Consequently, when the holding time of the component of the sample gas having a relatively low thermal conductivity constant is shorter than that of the component of the other sample gas, it is possible to increase the difference between the thermal conductivity of the carrier gas and the thermal conductivity of each component of the sample gas. As a result, it is possible to highly accurately detect each component of the sample gas.

Second Modification

In the embodiment described above, the switching unit 13 switches the type of carrier gas that flows through the flow passage at the sample side and the type of carrier gas that flows through the flow passage at the reference side. However, the switching unit 13 may only switch the type of carrier gas that flows through the flow passage at the sample side. In this case, the first carrier gas, the second carrier gas, or any gas other than the first carrier gas and the second carrier gas may be used as the carrier gas to be introduced into the reference side gas introduction chamber 22a. When the gas other than the first carrier gas and the second carrier gas is used as the reference side carrier gas, a storage container of the gas may be connected to the opposite side from the thermal conductivity detector 20 of the reference side flow passage 14a.

Third Modification

In the embodiment described above, the switch control unit 421 controls the switching unit 13 and performs the switching of carrier gas, after a predetermined time has passed from the start of the analysis. However, the display unit 34 may display an image indicating the measured data such as a chromatogram during the analysis in real time, and a user may input via the input unit 31 so as the switching of carrier gas is carried out, by viewing the image and after confirming that the detection of the component of the sample gas used for detecting the first carrier gas as the carrier gas has finished. Consequently, it is possible to detect the component of the sample gas by the first carrier gas without fail, and performs the switching of carrier gas.

The present disclosure is not limited to the contents of the embodiment described above. Other embodiments contemplated within the scope of the technical idea of the present disclosure are also included within the scope of the present disclosure.

What is claimed is:

1. An analysis method that performs analysis using a gas chromatograph including a thermal conductivity detector, the analysis method, comprising:
   introducing a carrier gas and a sample gas into a separation column;
   introducing the sample gas separated in the separation column into a gas introduction chamber including an element having an electrical characteristic changed by temperature;
   detecting a change in the electrical characteristic of the element due to the sample gas being introduced; and
   switching the carrier gas from a first carrier gas to a second carrier gas that is a different type from the first carrier gas, while a component of the sample gas is passing through the separation column, wherein
   the switching of the carrier gas is performed by a switching unit.

2. The analysis method of claim 1, wherein the type of the second carrier gas is set based on thermal conductivity of the component of the sample gas present in the separation column when the carrier gas is switched.

3. The analysis method of claim 2, wherein a thermal conductivity constant of the first carrier gas and a thermal conductivity constant of the second carrier gas differ from each other by 5 mW/(m·K) or more at 1 atm and 0 degrees Celsius.

4. The analysis method of claim 2, wherein a thermal conductivity constant of the first carrier gas is lower than a thermal conductivity constant of the second carrier gas.

5. The analysis method of claim 1, wherein a thermal conductivity constant of the first carrier gas and a thermal conductivity constant of the second carrier gas differ from each other by 5 mW/(m·K) or more at 1 atm and 0 degrees Celsius.

6. The analysis method of claim 5, wherein the thermal conductivity constant of the first carrier gas is lower than the thermal conductivity constant of the second carrier gas.

7. The analysis method of claim 1, wherein a thermal conductivity constant of the first carrier gas is lower than a thermal conductivity constant of the second carrier gas.

8. The analysis method of claim 7, wherein the carrier gas is switched from the first carrier gas to the second carrier gas, after detecting the change in the electrical characteristic of the element due to hydrogen contained in the sample gas.

9. The analysis method of claim 7, wherein the carrier gas is switched from the first carrier gas to the second carrier gas, after a predetermined time has passed from a start of the analysis.

10. The analysis method of claim 7, wherein the first carrier gas is argon.

11. The analysis method of claim 7, wherein the second carrier gas is helium.

12. The analysis method of claim 1, wherein a thermal conductivity constant of the first carrier gas is higher than a thermal conductivity constant of the second carrier gas.

13. The analysis method of claim 1, wherein a zero point of a detection signal of the thermal conductivity detector is calibrated according to switching of the carrier gas.

14. An analysis device configured to perform analysis using a gas chromatograph including a thermal conductivity detector, the analysis device, comprising:
   a gas introduction chamber configured to be connected to a separation column, and configured to include an element having an electrical characteristic changed by temperature; and
   a switching unit configured to switch a carrier gas introduced into the separation column from a first carrier gas to a second carrier gas that is a different type from the first carrier gas, while a component of a sample gas introduced into the separation column is passing through the separation column.

15. The analysis device of claim 14, further comprising:
   a calibrating unit configured to calibrate a zero point of a detection signal of the thermal conductivity detector according to switching of the carrier gas by the switching unit.

16. The analysis device of claim 15, wherein the switching unit switches the carrier gas from the first carrier gas to the second carrier gas, after a predetermined time has passed from a start of the analysis.

17. The analysis device of claim 16, further comprising:
   a display unit that displays an input screen for inputting the predetermined time.

18. The analysis device of claim 14, wherein the switching unit switches the carrier gas from the first carrier gas to the second carrier gas, after a predetermined time has passed from a start of the analysis.

19. The analysis device of claim 18, further comprising:
   a display unit that displays an input screen for inputting the predetermined time.

* * * * *